US011066259B2

(12) United States Patent
Warren et al.

(10) Patent No.: US 11,066,259 B2
(45) Date of Patent: Jul. 20, 2021

(54) DUST CONTROL SYSTEMS FOR BULK MATERIAL CONTAINERS

(71) Applicant: Halliburton Energy Services, Inc., Houston, TX (US)

(72) Inventors: Wesley John Warren, Marlow, OK (US); Austin Carl Schaffner, Duncan, OK (US); Chad Adam Fisher, Cache, OK (US); Bryan Chapman Lucas, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/319,539

(22) PCT Filed: Aug. 24, 2016

(86) PCT No.: PCT/US2016/048397
§ 371 (c)(1),
(2) Date: Jan. 22, 2019

(87) PCT Pub. No.: WO2018/038721
PCT Pub. Date: Mar. 1, 2018

(65) Prior Publication Data
US 2019/0276225 A1   Sep. 12, 2019

(51) Int. Cl.
B65G 69/18   (2006.01)
B65D 90/12   (2006.01)
(Continued)

(52) U.S. Cl.
CPC .......... B65G 69/181 (2013.01); B65D 90/12 (2013.01); B65D 90/54 (2013.01); B60P 1/56 (2013.01)

(58) Field of Classification Search
CPC ........ B65D 88/26; B65D 88/28; B65D 90/12; B65D 90/52; B65D 90/56; B60P 1/56;
(Continued)

(56) References Cited

U.S. PATENT DOCUMENTS 710,611 A   10/1902 Ray
917,646 A    4/1909 Otto
(Continued)

FOREIGN PATENT DOCUMENTS

CN   103950654 A   7/2014
EP     2937826 A1  10/2015
(Continued)

OTHER PUBLICATIONS

Office Action issued in related Canadian Patent Application No. 3030547 dated Nov. 21, 2019, 6 pages.
(Continued)

Primary Examiner — Glenn F Myers
(74) Attorney, Agent, or Firm — John Wustenberg; Baker Botts L.L.P.

(57) ABSTRACT

Controlling the dust emissions from the discharge of bulk materials from a container provides many benefits. A container engages a support structure that includes a frame. The frame includes a dust control enclosure coupled to an outlet or a hopper at the top of the frame and the container or a discharge gate of the container. The dust control enclosure comprises a collapsible and flexible material so that a tight seal is formed between the container and the hopper or the outlet of the frame. Dust from the discharged of the bulk material from the container is contained within the support structure. A dust control panel may also be disposed at the top of the frame to prevent any dust from migrating through the frame. The container may comprise a plurality of dust
(Continued)

enclosure panels to further prevent the escape of dust during discharge of the bulk material.

20 Claims, 6 Drawing Sheets

(51) Int. Cl.
*B65D 90/54* (2006.01)
*B60P 1/56* (2006.01)

(58) Field of Classification Search
CPC .... B65G 69/18; B65G 69/181; B65G 69/183; B65G 69/186
USPC .......................... 414/160, 162, 406, 414, 187
See application file for complete search history.

(56) References Cited

U.S. PATENT DOCUMENTS

| | | | |
|---|---|---|---|
| 1,519,153 A | 9/1923 | Mitton | |
| 1,726,603 A | 9/1929 | Wallace | |
| 1,795,987 A | 3/1931 | Adams | |
| 2,231,911 A | 2/1941 | Hitt et al. | |
| 2,276,950 A * | 3/1942 | Faller | B65G 69/181 |
| | | | 222/275 |
| 2,281,497 A | 4/1942 | Hyson et al. | |
| 2,385,245 A | 9/1945 | Willoughby | |
| 2,415,782 A | 2/1947 | Zadmach | |
| 2,513,012 A | 6/1950 | Dugas | |
| 2,563,470 A | 8/1951 | Kane | |
| 2,652,174 A | 9/1953 | Shea | |
| 2,670,866 A | 3/1954 | Glesby | |
| 2,678,737 A | 5/1954 | Mangrum | |
| 2,759,737 A | 8/1956 | Manning | |
| 2,802,603 A | 8/1957 | McCray | |
| 2,867,336 A | 1/1959 | Soldini et al. | |
| 3,049,248 A | 8/1962 | Heltzel et al. | |
| 3,083,879 A | 4/1963 | Coleman | |
| 3,151,779 A | 10/1964 | Rensch et al. | |
| 3,203,370 A | 8/1965 | Friedrich et al. | |
| 3,217,927 A | 11/1965 | Bale, Jr. et al. | |
| 3,318,473 A | 5/1967 | Jones et al. | |
| 3,326,572 A | 6/1967 | Murray | |
| 3,343,688 A | 9/1967 | Ross | |
| 3,354,918 A | 11/1967 | Coleman | |
| 3,404,963 A | 10/1968 | Fritsche et al. | |
| 3,432,151 A | 3/1969 | O'Loughlin et al. | |
| 3,467,408 A | 9/1969 | Emil | |
| 3,476,270 A | 11/1969 | Cox et al. | |
| 3,602,400 A | 8/1971 | Cooke | |
| 3,627,555 A | 12/1971 | Driscoll | |
| 3,698,693 A | 10/1972 | Poncet | |
| 3,707,998 A * | 1/1973 | Dalrymple | B65G 69/186 |
| | | | 141/93 |
| 3,785,534 A | 1/1974 | Smith | |
| 3,802,584 A | 4/1974 | Sackett, Sr. et al. | |
| 3,971,493 A * | 7/1976 | Williams | B65D 90/626 |
| | | | 222/185.1 |
| 3,986,708 A | 10/1976 | Heltzel et al. | |
| 4,023,719 A | 5/1977 | Noyon | |
| 4,058,239 A | 11/1977 | Van Mill | |
| 4,138,163 A | 2/1979 | Calvert et al. | |
| 4,178,117 A | 12/1979 | Brugler | |
| 4,204,773 A | 5/1980 | Bates | |
| 4,248,337 A | 2/1981 | Zimmer | |
| 4,258,953 A | 3/1981 | Johnson | |
| 4,313,708 A | 2/1982 | Tiliakos | |
| 4,395,052 A | 7/1983 | Rash | |
| 4,398,653 A | 8/1983 | Daloisio | |
| 4,423,884 A | 1/1984 | Gevers | |
| 4,544,279 A | 10/1985 | Rudolph | |
| 4,548,507 A | 10/1985 | Mathis et al. | |
| 4,583,663 A | 4/1986 | Bonerb | |
| 4,626,166 A | 12/1986 | Jolly | |
| 4,701,095 A | 10/1987 | Berryman et al. | |
| 4,806,065 A | 2/1989 | Holt et al. | |
| 4,850,702 A | 7/1989 | Arribau et al. | |
| 4,856,681 A | 8/1989 | Murray | |
| 4,900,157 A | 2/1990 | Stegemoeller et al. | |
| 4,919,540 A | 4/1990 | Stegemoeller et al. | |
| 4,956,821 A | 9/1990 | Fenelon | |
| 4,993,883 A | 2/1991 | Jones | |
| 4,997,335 A | 3/1991 | Prince | |
| 5,036,979 A | 8/1991 | Selz | |
| 5,096,096 A | 3/1992 | Calaunan | |
| 5,114,169 A | 5/1992 | Botkin et al. | |
| 5,149,192 A | 9/1992 | Hamm et al. | |
| 5,303,998 A | 4/1994 | Whitlatch et al. | |
| 5,339,996 A | 8/1994 | Dubbert et al. | |
| 5,343,813 A | 9/1994 | Septer | |
| 5,375,730 A | 12/1994 | Bahr et al. | |
| 5,401,129 A | 3/1995 | Eatinger | |
| 5,413,154 A | 5/1995 | Hurst, Jr. et al. | |
| 5,426,137 A | 6/1995 | Allen | |
| 5,441,321 A | 8/1995 | Karpisek | |
| 5,443,350 A | 8/1995 | Wilson | |
| 5,445,289 A | 8/1995 | Owen | |
| 5,590,976 A | 1/1997 | Kilheffer et al. | |
| 5,722,552 A | 3/1998 | Olson | |
| 5,772,390 A | 6/1998 | Walker | |
| 5,806,441 A | 9/1998 | Chung | |
| 5,913,459 A | 6/1999 | Gill et al. | |
| 5,915,913 A | 6/1999 | Greenlaw et al. | |
| 5,927,356 A | 7/1999 | Henderson | |
| 5,944,470 A | 8/1999 | Bonerb | |
| 5,997,099 A | 12/1999 | Collins | |
| 6,059,372 A | 5/2000 | McDonald et al. | |
| 6,112,946 A | 9/2000 | Bennett et al. | |
| 6,126,307 A | 10/2000 | Black et al. | |
| 6,193,402 B1 | 2/2001 | Grimland et al. | |
| 6,247,594 B1 | 6/2001 | Garton | |
| 6,379,086 B1 | 4/2002 | Goth | |
| 6,425,627 B1 | 7/2002 | Gee | |
| 6,491,421 B2 | 12/2002 | Rondeau et al. | |
| 6,517,232 B1 | 2/2003 | Blue | |
| 6,536,939 B1 | 3/2003 | Blue | |
| 6,537,015 B2 | 3/2003 | Lim et al. | |
| 6,568,567 B2 | 5/2003 | McKenzie et al. | |
| 6,622,849 B1 | 9/2003 | Spelling | |
| 6,655,548 B2 | 12/2003 | McClure, Jr. et al. | |
| 6,876,904 B2 | 4/2005 | Oberg et al. | |
| 6,980,914 B2 | 12/2005 | Bivens et al. | |
| 7,008,163 B2 | 3/2006 | Russell | |
| 7,086,342 B2 | 8/2006 | O'Neall et al. | |
| 7,100,896 B1 | 9/2006 | Cox | |
| 7,114,905 B2 | 10/2006 | Dibdin | |
| 7,252,309 B2 | 8/2007 | Eng Soon et al. | |
| 7,284,579 B2 | 10/2007 | Elgan | |
| 7,451,015 B2 | 11/2008 | Mazur et al. | |
| 7,475,796 B2 | 1/2009 | Garton | |
| 7,500,817 B2 | 3/2009 | Furrer et al. | |
| 7,513,280 B2 | 4/2009 | Brashears et al. | |
| 7,665,788 B2 | 2/2010 | Dibdin et al. | |
| 7,762,281 B2 | 7/2010 | Schuld | |
| 7,997,213 B1 | 8/2011 | Gauthier et al. | |
| 8,387,824 B2 | 3/2013 | Wietgrefe | |
| 8,434,990 B2 | 5/2013 | Claussen | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |
| 8,545,148 B2 | 10/2013 | Wanek-Pusset et al. | |
| 8,573,917 B2 | 11/2013 | Renyer | |
| 8,585,341 B1 | 11/2013 | Oren | |
| 8,607,289 B2 | 12/2013 | Brown et al. | |
| 8,616,370 B2 | 12/2013 | Allegretti et al. | |
| 8,622,251 B2 | 1/2014 | Oren | |
| 8,662,525 B1 | 3/2014 | Dierks et al. | |
| 8,668,430 B2 | 3/2014 | Oren et al. | |
| D703,582 S | 4/2014 | Oren | |
| 8,702,849 B2 | 4/2014 | Matson | |
| 8,827,118 B2 | 9/2014 | Oren | |

(56) References Cited

U.S. PATENT DOCUMENTS

| | | |
|---|---|---|
| 8,834,012 B2 | 9/2014 | Case et al. |
| 8,870,990 B2 | 10/2014 | Marks et al. |
| 8,887,914 B2 | 11/2014 | Allegretti et al. |
| RE45,713 E | 10/2015 | Oren et al. |
| 9,162,261 B1 | 10/2015 | Smith |
| 9,162,603 B2 | 10/2015 | Oren |
| 9,169,706 B2 | 10/2015 | Kellam, III |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,296,572 B2 | 3/2016 | Loughton et al. |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,569,242 B2 | 2/2020 | Stegemoeller et al. |
| 10,604,338 B2 | 3/2020 | Allegretti |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 | 1/2007 | Diosse et al. |
| 2007/0201305 A1 | 8/2007 | Heilman et al. |
| 2008/0172996 A1* | 7/2008 | McCutchen .......... B01D 45/18 55/432 |
| 2008/0187423 A1 | 8/2008 | Mauchle |
| 2008/0277121 A1 | 11/2008 | Phillippi et al. |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0314791 A1 | 12/2009 | Hartley et al. |
| 2010/0319921 A1 | 12/2010 | Eia et al. |
| 2012/0017812 A1 | 1/2012 | Renyer et al. |
| 2012/0018093 A1 | 1/2012 | Zuniga et al. |
| 2012/0037231 A1 | 2/2012 | Janson |
| 2012/0090956 A1 | 4/2012 | Brobst |
| 2012/0181093 A1 | 7/2012 | Fehr et al. |
| 2012/0219391 A1 | 8/2012 | Teichrob et al. |
| 2013/0135958 A1 | 5/2013 | O'Callaghan |
| 2013/0142601 A1 | 6/2013 | McIver et al. |
| 2013/0206415 A1 | 8/2013 | Sheesley |
| 2013/0284729 A1 | 10/2013 | Cook et al. |
| 2013/0309052 A1 | 11/2013 | Luharuka et al. |
| 2014/0023463 A1 | 1/2014 | Oren |
| 2014/0044508 A1 | 2/2014 | Luharuka et al. |
| 2014/0083554 A1 | 3/2014 | Harris |
| 2014/0216736 A1 | 8/2014 | Leugemors et al. |
| 2014/0305769 A1 | 10/2014 | Eiden, III et al. |
| 2014/0377042 A1 | 12/2014 | McMahon |
| 2015/0003955 A1 | 1/2015 | Oren et al. |
| 2015/0016209 A1 | 1/2015 | Barton et al. |
| 2015/0079890 A1 | 3/2015 | Stutzman et al. |
| 2015/0157995 A1 | 6/2015 | Fordyce et al. |
| 2015/0183578 A9 | 7/2015 | Oren et al. |
| 2015/0191318 A1 | 7/2015 | Martel |
| 2015/0203289 A1 | 7/2015 | Farrell et al. |
| 2015/0284194 A1 | 10/2015 | Oren et al. |
| 2015/0353293 A1 | 12/2015 | Richard |
| 2015/0360855 A1 | 12/2015 | Oren et al. |
| 2015/0360885 A1 | 12/2015 | Ugarte et al. |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0059168 A1 | 3/2016 | Bataille et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver et al. |
| 2017/0129696 A1 | 5/2017 | Oren |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0320660 A1 | 11/2017 | Sanders et al. |
| 2017/0334639 A1 | 11/2017 | Hawkins et al. |
| 2017/0349226 A1 | 12/2017 | Oren et al. |
| 2018/0002120 A1 | 1/2018 | Allegretti et al. |
| 2018/0257814 A1 | 9/2018 | Allegretti et al. |
| 2018/0369762 A1 | 12/2018 | Hunter et al. |
| 2019/0009231 A1 | 1/2019 | Warren et al. |
| 2019/0111401 A1 | 4/2019 | Lucas et al. |

(56) References Cited

U.S. PATENT DOCUMENTS

| | | |
|---|---|---|
| 2020/0062448 A1 | 2/2020 | Allegretti et al. |
| 2020/0147566 A1 | 5/2020 | Stegemoeller et al. |

FOREIGN PATENT DOCUMENTS

| | | |
|---|---|---|
| GB | 2066220 A | 7/1981 |
| GB | 2204847 A1 | 11/1988 |
| JP | 2003-267480 A | 9/2003 |
| JP | 2008239019 A | 10/2008 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 5/2014 |
| WO | 2015119799 A1 | 8/2015 |
| WO | 2015/199993 A1 | 12/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |
| WO | 2016178691 A1 | 11/2016 |
| WO | 2016178692 A1 | 11/2016 |
| WO | 2016178694 A1 | 11/2016 |
| WO | 2016178695 A1 | 11/2016 |
| WO | 2017014768 A1 | 1/2017 |
| WO | 2017014771 A1 | 1/2017 |
| WO | 2017014774 A1 | 1/2017 |
| WO | 2017027034 A1 | 2/2017 |

OTHER PUBLICATIONS

International Search Report and Written Opinion issued in related PCT Application No. PCT/US2016/048397 dated May 19, 2017, 12 pages.

Office Action issued in related Canadian Patent Application No. 2996055 dated Oct. 2, 2020, 5 pages.

U.S. Pat. No. 0802254A, Oct. 17, 1905, "Can-Cooking Apparatus," John Baker et al.

* cited by examiner

DUST CONTROL SYSTEMS FOR BULK MATERIAL CONTAINERS

CROSS-REFERENCE TO RELATED APPLICATION

The present application is a U.S. National Stage Application of International Application No. PCT/US2016/048397 filed Aug. 24, 2016, which is incorporated herein by reference in its entirety for all purposes.

TECHNICAL FIELD

The present disclosure relates generally to transferring dry bulk materials, and more particularly, to structures that prevent dust from escaping during the discharging of bulk materials from containers.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, for example, skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (for example, silo). The storage/delivery system may then deliver the bulk material onto a conveyor or into a hopper, which meters the bulk material through a chute into a blender tub.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. The containers are eventually emptied by dumping the contents thereof onto a mechanical conveying system (for example, conveyor belt, auger, bucket lift, etc.). The conveying system then moves the bulk material in a metered fashion to a desired destination at the well site.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
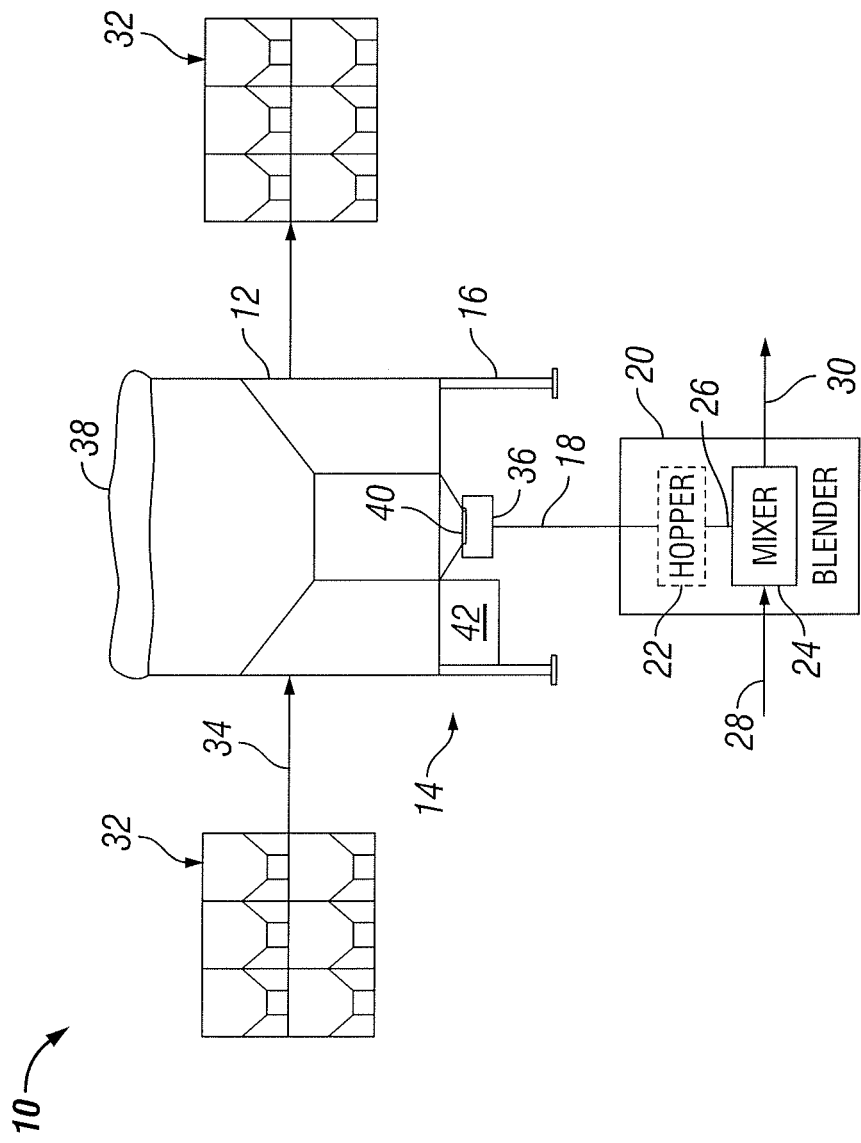
FIG. 1 is a schematic block diagram of a bulk material handling system with a dust control system suitable for releasing bulk material from a container disposed on a portable support structure, in accordance with one or more aspects of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Throughout this disclosure, a reference numeral followed by an alphabetical character refers to a specific instance of an element and the reference numeral alone refers to the element generically or collectively. Thus, as an example (not shown in the drawings), widget "1A" refers to an instance of a widget class, which may be referred to collectively as widgets "1" and any one of which may be referred to generically as a widget "1". In the figures and the description, like numerals are intended to represent like elements.

Certain embodiments according to the present disclosure may be directed to systems and methods for efficiently managing bulk material (for example, bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently moving bulk material into a blender inlet of a blender unit at a job site. The systems may include a portable support structure used to receive one or more portable containers of bulk material and output bulk material from the containers directly into the blender inlet. The disclosed techniques may be used to efficiently handle any desirable bulk material having a solid or liquid constituency including, but not limited to, sand, proppant, gel particulate, diverting agent, dry-gel particulate, liquid additives and others.

In currently existing on-site bulk material handling applications, dry material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container at a desired time.

In existing systems, the containers are generally supported above a mechanical conveying system (for example, moving belt, auger, bucket lift, etc.) prior to releasing the bulk material. The discharge gates on the containers are opened to release the bulk material via gravity onto the moving mechanical conveying system. The mechanical conveying system then directs the dispensed bulk material toward a desired destination, such as a hopper on a blender unit. Unfortunately, this process can generate and release a relatively large amount of dust or particulates into the air if uncontrolled and result in unintended material spillage. In addition, the mechanical conveying system is generally run on auxiliary power and, therefore, requires an external power source to feed the bulk material from the material storage units to the blender.

The material handling systems having the support structure disclosed herein are designed to address and eliminate the shortcomings associated with existing bulk material handling systems. Particles or dust emissions released into the surrounding air or environment from the discharge of bulk materials at a site or operation may not be desirable and may be harmful to nearby operators, machinery and the environment. Such discharge of particles requires additional personnel and cost associated with the collection and disposal of the reclaimed material. For example, with respect to sand, respirable silica dust is generated when a sand particle is impacted and damaged causing the particle to be broken into more than one piece. The dust emissions or particles may be generated from the sand falling from one height to another or being mechanically thrusted into another object. For example, the sand may be discharged from an outlet of the container into a chute. One or more aspects of the present disclosure control, minimize or eviscerate the release of this dust to prevent waste and any environmental impact by using one or more dust control systems.

Turning now to the drawings, FIG. 1 is a block diagram of a bulk material handling system 10 with a dust control system 36. The system 10 includes a container 12 elevated on a support structure such as portable support structure 14 and holding a quantity of bulk material 38. The portable support structure 14 may include a frame 16 for receiving and holding the container 12 and an outlet 18, for example, a gravity feed outlet, for directing bulk material 38 away from the container 12. The outlet 18 may be coupled to and extending from the frame 16. The outlet 18 may utilize a gravity feed to provide a controlled or metered, flow of bulk material 38 from the container 12 to a blender unit 20. In one or more embodiments, outlet 18 may comprise a chute system for guiding discharged bulk material 38 from the container 12 to blender unit 20. The outlet 18 may couple to a dust control system 36. The dust control system 36 may be part of, included with, or otherwise attached to the outlet 18.

While dust control system 36 is shown at the portion of outlet 18 near the container 12, the present disclosure contemplates that the dust control system 36 may be located at any location along outlet 18.

As illustrated, the blender unit 20 may include a blender hopper 22 and a mixer 24 (for example, a mixing compartment). The blender unit 20 may also include a metering mechanism 26 for providing a controlled or metered flow or discharge of bulk material 38 from the blender hopper 22 to the mixer 24. However, in other embodiments the blender unit 20 may not include the blender hopper 22, such that the outlet 18 of the support structure 14 may provide bulk material 38 directly into the blender unit 20. In one or more embodiments, blender unit 20 may be any unit or device for collecting the discharged bulk material 38 from the blender hopper 22 suitable for a given operation.

Water and other additives may be supplied to the mixer 24 (for example, the mixing compartment) through a fluid inlet 28. As those of ordinary skill in the art will appreciate, the fluid inlet 28 may comprise more than the one input flow line illustrated in FIG. 1. The bulk material 38 and a fluid, such as water, or other material may be mixed in the mixer 24 to produce (at a mixer outlet 30) a fracking fluid, a mixture combining multiple types of proppant, proppant/dry-gel particulate mixture, sand/sand-diverting agents mixture, cement slurry, drilling mud, a mortar or concrete mixture, or any other fluid mixture for use on location, for example, at a well site or drilling operation. The mixer outlet 30 may be coupled to a pump for conveying the treating fluid to a desired location (for example, a hydrocarbon recovery well) for a treating process. It should be noted that the disclosed system 10 may be used in other contexts as well. For example, the bulk material handling system 10 may be used in concrete mixing operations (for example, at a construction site) to dispense aggregate from the container 12 through the outlet 18 into a concrete mixing apparatus (mixer 24). In addition, the bulk material handling system 10 may be used in agriculture applications to dispense grain, feed, seed, or mixtures of the same.

Vacuum system 42 may also provide control of dust emissions or particulates to prevent such from being dispersed to the environment. While vacuum system 42 is illustrated disposed about a bottom portion of the container 12 or at frame 16, the present invention contemplates vacuum system 42 being disposed as part of dust control system 36, about frame 16, about container 12, or at any other suitable location of system 10.

It should be noted that the disclosed container 12 may be utilized to provide bulk material 38 for use in a variety of fields, area, or treating processes. For example, the disclosed systems and methods may be utilized to provide proppant materials into fracture treatments performed on a hydrocarbon recovery well. In other embodiments, the disclosed techniques may be used to provide other materials (for example, non-proppant) for diversions, conductor-frac applications, cement mixing, drilling mud mixing, and other fluid mixing applications. In other embodiments, the disclosed techniques may be used to provide materials for agriculture or land development (such as construction sites for buildings, roads, bridges, or other structures). In one or more embodiments, the container 12 may be open at the top such that bulk material 38 may be exposed. In one or more embodiments, the container 12 may have a top wall (not shown) that has an opening or gate (not shown) to allow the container 12 to be filled with bulk material 38.

As illustrated, the container 12 may be elevated above an outlet location, for example, the outlet 18, via the frame 16.

The support structure 14 is designed to elevate the container 12 above the level of the blender inlet (for example, blender hopper 22, mixer 24 or both) to allow the bulk material 38 to gravity feed from the container 12 to the blender unit 20. This way, the container 12 is able to sit on the frame 16 of the support structure 14 and output bulk material 38 directly into the blender unit 20 via the outlet 18 of the support structure 14.

Although shown as supporting a single container 12, other embodiments of the frame 16 may be configured to support multiple containers 12. The exact number of containers 12 that the support structure 14 can hold may depend on a combination of factors such as, for example, the volume, width, and weight of the containers 12 to be disposed thereon and available space.

The container 12 may be completely separable and transportable from the frame 16, such that any container 12 may be selectively removed from the frame 16 and replaced with another container 12. When the bulk material 38 from the container 12 runs low or empties, a new container 12 may be placed on the frame 16 to maintain a steady flow of bulk material 38 to an outlet location. In one or more embodiments, the container 12 may be closed before being completely emptied, removed from the frame 16, and replaced by a container 12 holding a different type of bulk material 38 to be provided to the outlet location.

The containers 12 may be transported to the desired location on a transportation unit (for example, a truck, train, vessel, or any other transport unit). The containers 12 could be stored on the transportation unit itself or may be a skid, a pallet, or some other holding area. One or more containers 12 of bulk material 38 may be transferred from the storage area 32 onto the support structure 14, as indicated by arrow 34. This transfer may be performed by lifting the container 12 via a hoisting mechanism, such as a forklift, a crane, or a specially designed container management device.

When the one or more containers 12 are positioned on the support structure 14, one or more discharge gates 40 of one or more of the containers 12 may be opened, allowing bulk material 38 to flow from the containers 12 into the outlet 18 of the support structure 14. The outlet 18 may then route the flow of bulk material 38 directly into a blender inlet (for example, into the blender hopper 22 or mixer 24) of the blender unit 20.

After one or more of the containers 12 on the support structure 14 are emptied, the empty container(s) 12 may be removed from the support structure 14 via a hoisting mechanism. In some embodiments, the one or more empty containers 12 may be positioned on another storage area 32 (for example, a transportation unit, a skid, a pallet, or some other holding area) until they can be removed from the site, refilled or both. In other embodiments, the one or more empty containers 12 may be positioned directly onto a transportation unit for transporting the one or more empty containers 12 away from the site. It should be noted that the same transportation unit used to provide one or more filled containers 12 to the location may then be utilized to remove one or more empty containers 12 from the site.

Figure 2:
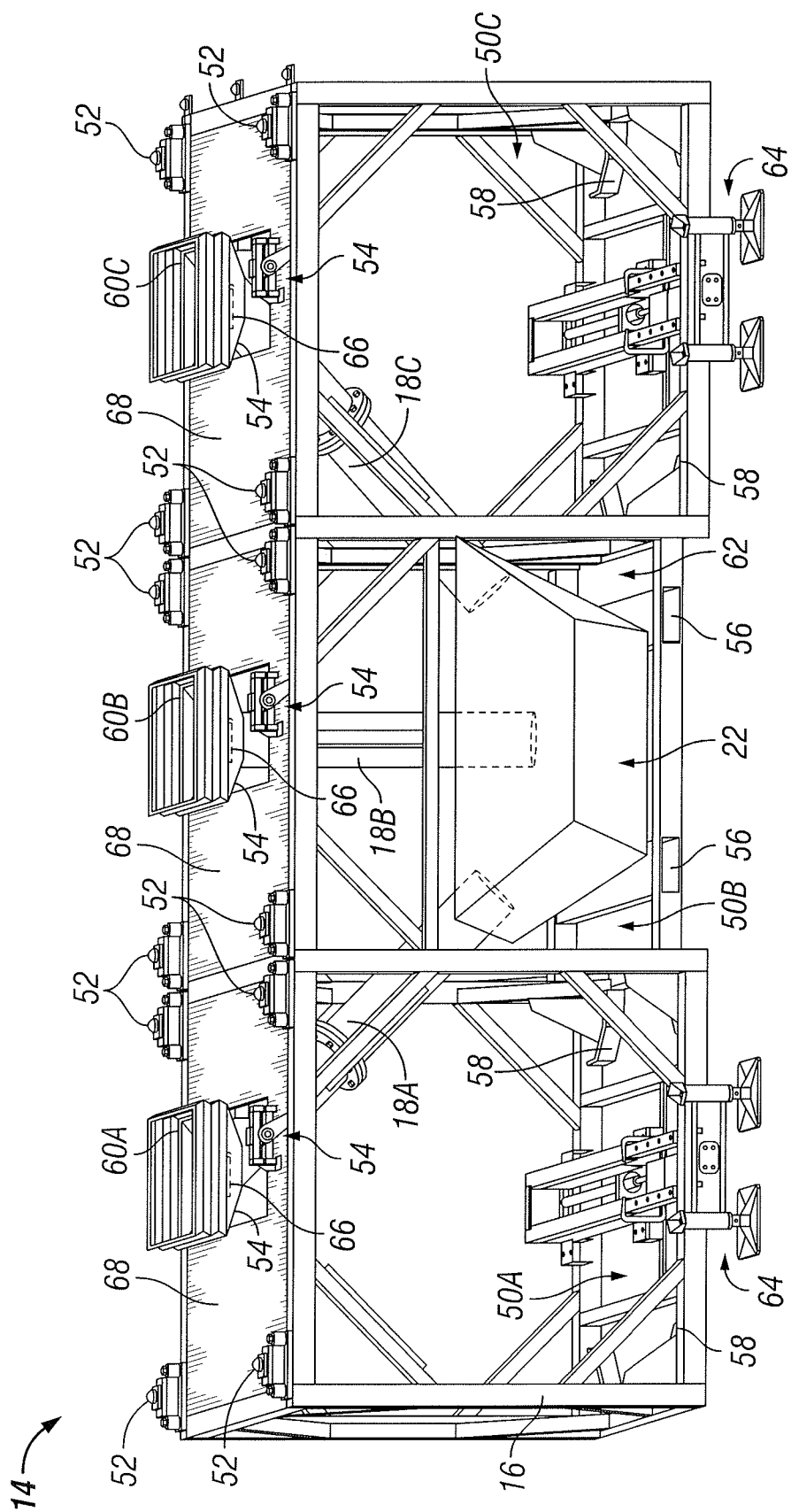
FIG. 2 is a perspective view for a container support structure with a dust control system, in accordance with one or more aspects of the present disclosure.

FIG. 2 is a perspective view for a container support trailer with a dust control system, in accordance with one or more aspects of the present disclosure. FIG. 2 illustrates an embodiment of the support structure 14 that may be designed to receive multiple containers, for example, containers 12 illustrated in FIG. 1. Specifically, the support structure 14 includes a frame 16 sized to receive and support up to three portable containers 12. While only three containers 12 are illustrated as being supported by or disposed about frame 16, the present invention contemplates any number of containers 12 being supported by or disposed about frame 16. The frame 16 may include several beams connected together (for example, via welds, rivets or bolts) to form a continuous group of cubic or rectangular shaped supports 50 coupled end to end. For example, in the illustrated embodiment, the frame 16 generally includes one continuous, elongated rectangular body broken into three distinct cubic/rectangular supports 50A, 50B, and 50C. Each cubic/rectangular support 50 may be used to support a single container 12. The frame 16 may include additional beams that function as trusses to help support the weight of the filled containers 12 disposed on the frame 16. Other shapes, layouts, and constructions of the frame 16 may be used in one or more embodiments. In addition, other embodiments of the support structure 14 may include a frame 16 sized to receive any number (for example, 1, 2, 4, 5, 6, 7, or more) or portable containers 12.

As illustrated, the support structure 14 may be equipped with a plurality of locator pins 52 disposed on top of the frame 16 for locating and holding the containers 12 on the frame 16. The containers 12 may include complementary engagement features designed to interface with the locator pins 52, thus enabling a precise placement of the containers 12 into desired locations on the frame 16. In the illustrated embodiment, the locator pins 52 are generally disposed at the corners on the upper face of each cubic/rectangular support 50. However, other placements of the locator pins 52 along the upper surface of the support structure 16 may be utilized in other embodiments.

The support structure 14 may also include one or more actuators 54 designed to aid in actuation of a discharge gate 40 of the one or more containers 12 disposed on the frame 16. In the illustrated embodiment, the actuators 54 may be rotary actuators designed to rotate into engagement with a discharge gate 40 of a container 12 to transition the discharge gate 40 between a closed position and an open position. In other embodiments, the actuators 54 may be linear actuators designed to interface with the discharge gates 40 of the containers 12 to selectively open and close the discharge gates 40. In some embodiments, the actuators 54 may include a set of two actuators (disposed on opposite sides of the frame 16) for actuating the discharge gate 40 of a single container 12 disposed on the frame 16. In such an arrangement, one of the actuators 54 may transition the discharge gate 40 from closed to open, while the opposite actuator 54 may transition the gate from an open position to closed position.

The illustrated support structure 14 may be transportable to and from a desired or predetermined location on a flatbed trailer (such as support structure 14 of FIG. 3) or some other transportation unit. Once at a location, a hoisting mechanism (for example, forklift, crane, etc.) (not shown) may be used to remove the support structure 14 from the transportation system unit and to place the support structure 14 into a desired or predetermined position. To that end, the support structure 14 may include slots 56 that a forklift can engage to lift and manipulate the portable support structure 14 about the site. In the illustrated embodiment, the slots 56 are formed in a section of the frame 16 that is slightly elevated above a lower edge of the support structure 14. This may enable relatively easy release of the forklift from the support structure 14 once the support structure 14 is positioned on the ground or predetermined location. The slots 56 may be formed through a central portion (for example, central cubic/rectangular support 50B) of the elongated support structure 14 to keep the weight of the support structure 14 evenly distributed during movement at the site or predetermined location. In other embodiments, the support structure 14 may include other types of mechanical features for interfacing with another type of hoisting mechanism. For example, the support structure 14 may include one or more lifting eyes (not shown) for interfacing with a crane (not shown) used to position the support structure 14 as needed at the site or predetermined location.

Once the forklift (or other hoisting mechanism) brings the support structure 14 to a desired location at the site, the hoisting mechanism may lower the support structure 14 onto the ground or a relatively flat loading area proximate the ground level, or other predetermined location. The frame 16 may include corner supports 58 for distributing a weight of the support structure 14 (and any containers 12 disposed thereon) along the ground surface or predetermined location. As shown, the corner supports 58 may be disposed along the lower surface of the frame 16 at various corners of the cubic/rectangular supports 50. In the illustrated embodiment, for example, the corner supports 58 may be disposed at the lower corners of the two outside cubic/rectangular supports 50A and 50C, since the lower surface of the central support 50B is slightly elevated above the ground level.

As described above, the support structure 14 may include several outlets 18A, 18B and 18C for routing bulk material 38 directly from one or more containers 12 disposed on the frame 16 into a blender inlet. The term "blender inlet" used herein may refer to any number of inlets to tubs, hoppers, mixers, and other areas where bulk material is needed. As mentioned above, the blender inlet may be associated with a blender unit 20 disposed at a job site (for example, at a well site). For example, the blender inlet may be a blender hopper (for example, bender hopper 22 of FIG. 1) used to provide bulk material 38 to a metering system that meters the bulk material into a mixer 24. In other embodiments, the blender inlet may be an inlet directly into a mixing vessel (for example, mixer 24 of FIG. 1) of a blender unit 20. In such instances, the mixing vessel may be configured such that it is sitting directly on the ground or other substantially level location, instead of in an elevated position within the blender. This may enable a container 12 to dump bulk material 38 directly into the mixer 24, without the container 12 being elevated exceedingly high or above a predetermined threshold. In still other embodiments, the blender inlet may be a mixer feeder (for example, conveyor, sand screw, or the metering mechanism 26 of FIG. 1). Other embodiments may utilize other types of blender inlets for receiving the bulk material 38 from a container 12 disposed on the support structure 14.

In the illustrated embodiment, the blender unit 20 and support structure 14 may be designed such that the support structure 14 routes bulk material 38 directly from a container 12 into the blender hopper 22. The "blender inlet" may correspond to the blender hopper 22. In FIG. 2, the blender hopper 22 is shown schematically without showing the rest of the blender unit 20 (for example, mixing compartment, sand screws for transporting bulk material from the blender hopper 22 to the mixer 24, or any other suitable unit). Again, it should be noted that other embodiments of the blender unit 20 may feature other types of blender inlets into which the outlets 18 are designed to route bulk material 38 from one or more containers 12.

The outlets 18A, 18B, and 18C may be used to deliver a flow of bulk material 38 to the blender hopper 22 (or other blender inlet) from each of three respective containers 12 disposed on the frame 16. In some embodiments, the support structure 14 may also include individual hoppers 60A, 60B, and 60C at the top of the frame 16 for funneling bulk material 38 from the discharge gate 40 of the corresponding containers 12 into the outlets 18A, 18B, and 18C, respectively.

In one or more embodiments, a dust control system 36 may be utilized to control the escape of dust during discharge of bulk material 38. In one or more embodiments, a dust control system 36 may comprise a dust control enclosure 66. Dust control enclosure 66 may be coupled, attached or otherwise affixed to or engage hopper 60B or outlet 18B. While only one dust control enclosure 66 is illustrated in FIG. 2, the present disclosure contemplates any number of dust control enclosures 66 coupled to any number of corresponding hoppers 60. Dust control enclosure 66 may comprise a collapsible, semi-collapsible, flexible or any other suitable material to allow the dust control enclosure 66 to expand, contract or both. In one or more embodiments, dust control enclosure 66 may be coupled directly to outlet 18 when hopper 60 is not present.

Figure 5:
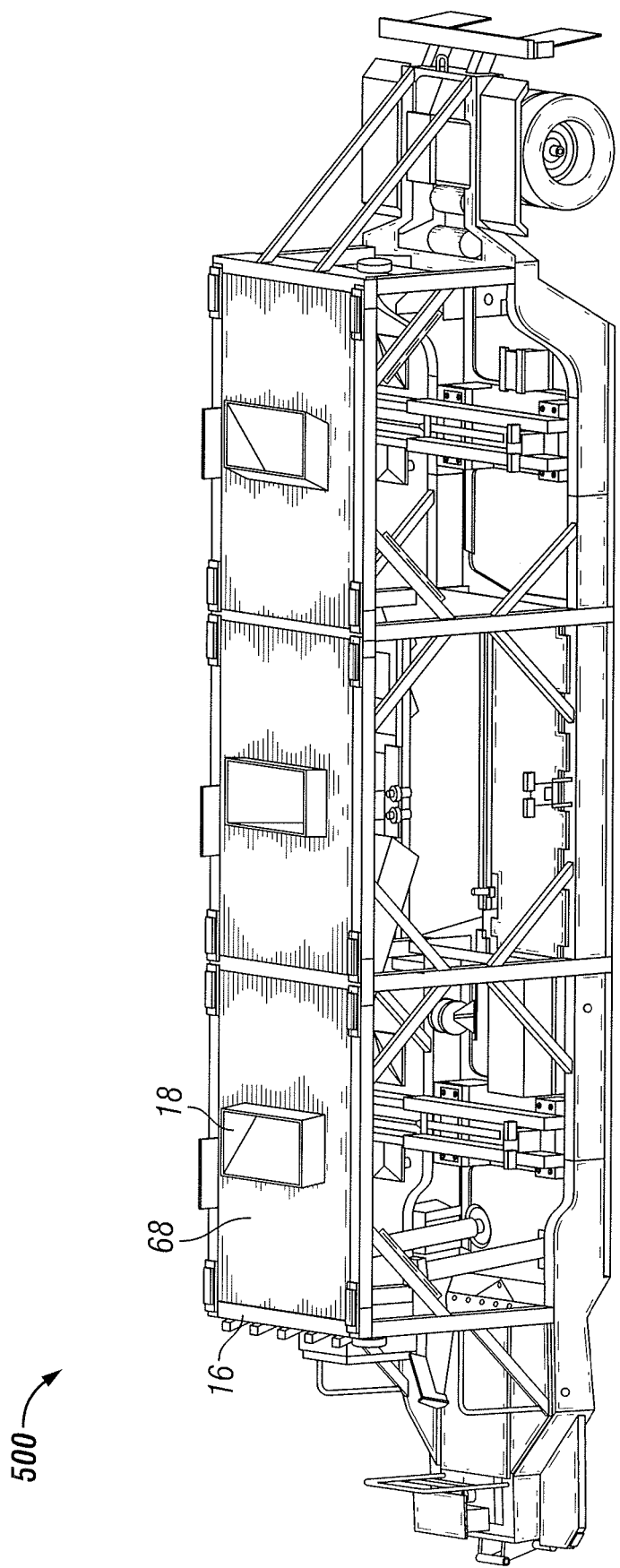
FIG. 5 is a perspective view of one or more dust control panels for a dust control system in accordance with one or more aspects of the present disclosure.

In one or more embodiments, a dust control system 36 may comprise a dust control panel or shroud 68. As illustrated in FIG. 5, dust control panel 68 is disposed about outlet 18. Dust control panel 68 may be coupled, attached or otherwise affixed to frame 16, for example, a top portion of frame 16 as illustrated in FIG. 5. The present disclosure contemplates any number of dust control panels 68 associated with one or more hoppers 60 or outlets 18 coupled to frame 16. Dust control panels 68 may comprise any material suitable for controlling dust and coupling to frame 16. In one or more embodiments dust control panel 68 covers or encloses a top portion of frame 16 at or near the bottom of hopper 60 or the top of chute 18. Dust control panel 68 may be of a thickness to be within a predetermined distance from a container 12 when a container 12 is placed on top of the frame 16. In one or more embodiments, dust control panel 68 may have a suitable shape for covering any opening of frame 16 as discussed with respect to FIG. 5.

The outlets 18A, 18B, and 18C may be chutes positioned so that the upper end of each chute is disposed beneath a discharge gate 40 of a corresponding container 12 (or one of the hoppers 60) on the frame 16. In one or more embodiments, the discharge gate 40 is configured to engage the dust control enclosure 66 when in at least an open or partially open position to form a seal to prevent the escape of dust during discharge of bulk material 38. In one or more embodiments, the discharge gate 40 is a horizontally or vertically slidable gate. In one or more embodiments, the discharge gate 40 comprises one or more slots to provide metering of the discharge of bulk material 38.

In one or more embodiments, the outlets 18 may be positioned such that the lower end of each of the gravity feed outlets 18 is disposed fully within the blender hopper 22. This allows the outlets 18 to provide bulk material 38 from all of the containers 12 positioned on the frame 16 into the same blender inlet (for example, blender hopper 22) at or near the same time. The outlets 18 may provide a gravity feed where an angle of repose of the bulk material 38 exiting the outlets 18 is able to choke the flow of bulk material 38 through the outlets 18. As bulk material 38 is metered from the blender hopper 22 into another portion of the blender unit 20 (for example, mixer 24), additional bulk material 38 flows via gravity into the blender hopper 22 directly from the one or more gravity feed outlets 18. In embodiments where the outlets 18 are positioned to route bulk material 38 directly from the containers 12 into an inlet of the mixer 24 of the blender unit 20, the gravity feed outlets 18, the blender inlet, or both may feature a metering gate/valve that regulates the amount of bulk material 38 provided to the mixer 24 (for example, instead of separate sand screws)

The disclosed outlets 18 provide a more controlled output of bulk material 38 to the blender inlet (for example, blender hopper 22) than would be available through the use of mechanical conveying systems to drop bulk material 38 into the blender hopper 22. In addition, the choke feed of bulk material 38 through the outlets 18 and into the blender inlet may reduce an amount of dust generated at a well site, as compared to existing pneumatic or mechanical conveying systems. Further, the outlets 18 are able to route the bulk material 38 directly into the blender inlet from the containers 12 without the use of pneumatic or mechanical conveyance equipment operating on auxiliary power making moving the bulk material more efficient than would be possible using a separate pneumatic or mechanical conveyor between the containers and the blender.

It may be desirable for the outlets 18 to be angled by a certain amount so that the lower ends of the outlets 18 interface directly with the blender hopper 22. In some embodiments, the angle of inclination of each gravity feed outlet 18 from a horizontal plane may be between approximately 25 and 55 degrees, between approximately 30 and 50 degrees, between approximately 35 and 45 degrees, or equal to approximately 40 degrees. As shown, it may be desirable to angle the outlets 18 such that outlets 18 direct the bulk material 38 toward a central collection point proximate a center portion (for example, support 50B) of the support structure 14.

Although illustrated in FIG. 2, the blender hopper 22 (or other blender inlet) may be entirely separate from the support structure 14. As described above, the blender inlet may be part of a separate blender unit (for example, blender unit 20 of FIG. 1). It may be desirable to position the support structure 14 and the blender unit 20 relative to one another to bring the outlets 18 into the desired discharge positions within the blender inlet (for example, blender hopper 22). To that end, the support structure 14 may include an opening 62 disposed therein for receiving or being positioned over the blender inlet. In some embodiments, a forklift or some other transportation unit may lift the portable support structure 14 and lower the support structure 14 directly over the blender unit 20 so that the opening 62 is positioned over the blender inlet and the outlets 18 extend into the blender inlet. In addition to or in lieu of this placement of the support structure 14, the blender unit 20 may be backed up relative to support structure 14 (which is already positioned on the ground) until the blender inlet (for example, blender hopper 22) is received into the opening 62 and aligned with the outlets 18.

In some instances, the support structure 14 may be equipped with a set of outriggers 64 to increase the stability of the portable support structure 14. The outriggers 64 may help to keep the support structure 14 stable in the event of high winds or the support structure 14 being impacted by a container, forklift, blender, or other pieces of equipment at the job site. In addition, the outriggers 64 on the support structure 14 may be used for interfacing with the blender unit 20 to bring the blender inlet into a desired position or alignment within the opening 62 of the support structure 14.

Figure 3:
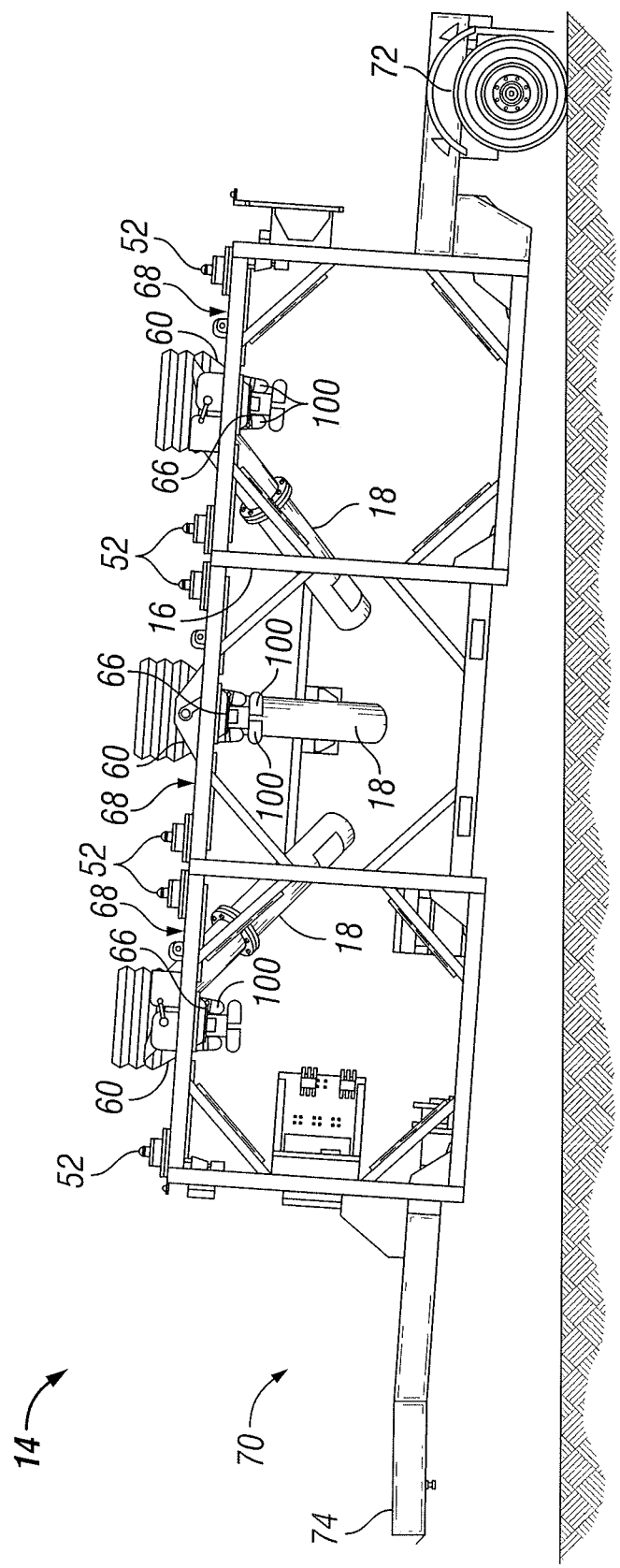
FIG. 3 is a side view for a dust control system integrated with a trailer unit, in accordance with an embodiment of the present disclosure.

To further improve the mobility, transportability, and rig-up speed at the job site, the portable support structure 14 may be integrated into a specialized support structure trailer unit 70, as shown in FIG. 3. As illustrated, the support structure trailer unit 70 may include similar components as the above described support structure 14 (for example, frame 16 and one or more outlets 18). In addition, the support structure trailer unit 70 includes wheels 72 for enabling transportation of the support structure trailer unit 70 to and from a desired or predetermined location (for example, a well site). In the illustrated embodiment, a front end 74 of the support structure trailer unit 70 may be designed to lift up and hook onto a trailer hitch of a transportation vehicle. Once the support structure trailer unit 70 is transported to the site, the front end 74 may be lifted off the transportation vehicle and the support structure trailer unit 70 may be lowered directly to the ground, without the use of a hoisting mechanism (for example, forklift, crane, etc.). The support structure 14 may be integrated into other types of mobile trailer units as well.

Having the support structure 14 integrated into a separate mobile unit such as support structure trailer unit 70 may improve the reliability of the various components that make up the support structure 14 and increase the life of the support structure 14. This is because every time the support structure 14 is lifted or moved via a hoisting mechanism, for example, the frame 16, electronics, controls, outlets 18 or any combination thereof can be negatively impacted. Shock from movement of the relatively large support structure about a site can lead to undesirable operations of the support structure components. With the support structure 14 integrated into the trailer unit 70, the shock due to loading/unloading the portable support structure 14 itself is minimized.

As shown, the support structure 14 itself may include a number of electronic components such as, for example, the automated actuators 54 described above with reference to FIG. 2. These actuators 54 may be controlled to open, close or both a discharge gate 40 of one or more containers 12 elevated on the support structure 14. The support structure 14 may also include one or more indicators 100 (for example, indicator lights) disposed on the support structure for providing various information about the operating state of the support structure 14. For example, in the embodiment shown in FIG. 3, the support structure 14 may include at least one indicator 100 corresponding to each automated actuator 54 on the support structure 14. The indicators 100 may include lights designed to indicate whether the discharge gates of containers disposed on the support structure 14 are in an open position or in a closed position, based on the operating state of the corresponding actuators 54.

In some embodiments, the support structure trailer unit 70 may also include an air suspension system or other components to reduce shock on the support structure 14 during transportation of the trailer unit 70 (for example, traveling along a road). The suspension system may help to further isolate the electronics and controls of the support structure from shock loading during transportation of the support structure trailer unit 70 along the road.

Figure 4:
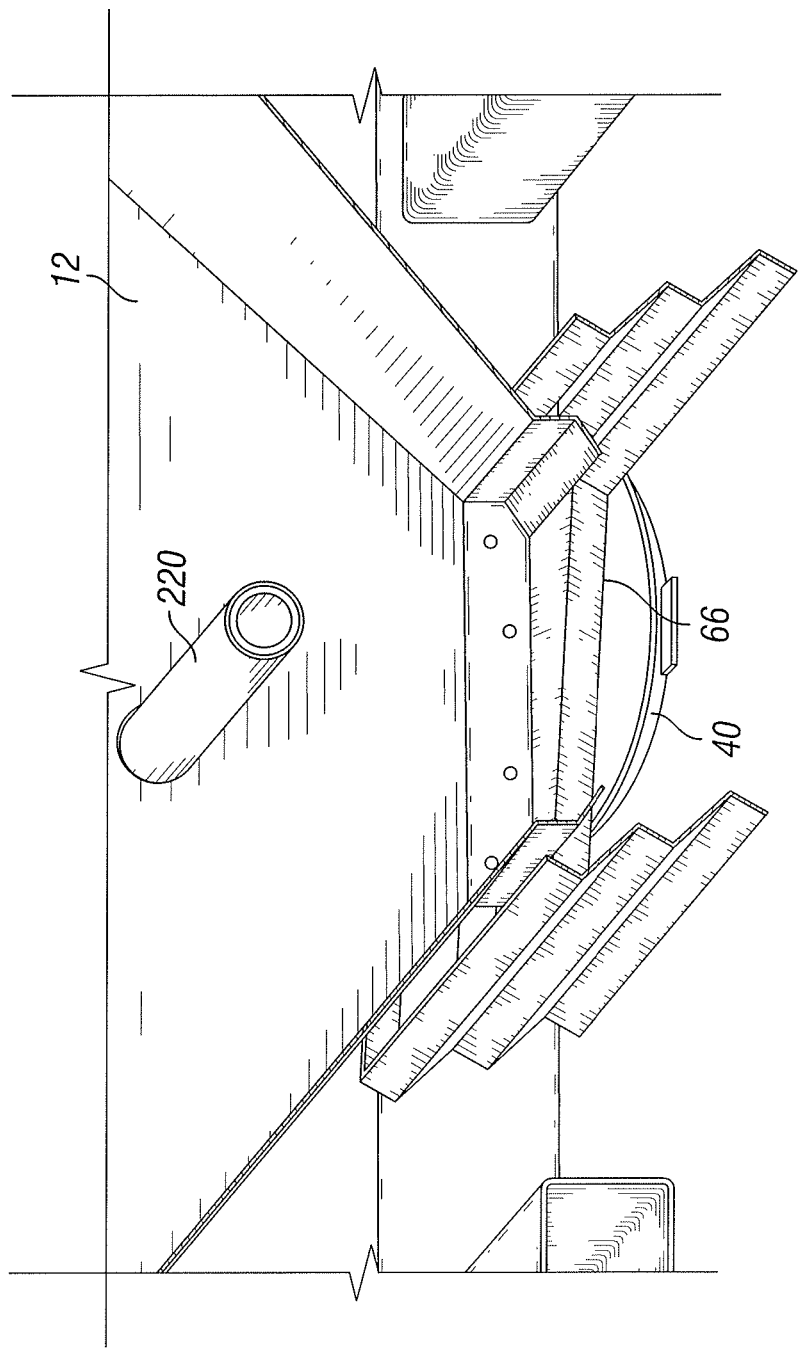
FIG. 4 is a perspective view of a dust control enclosure for a dust control system in accordance with one or more aspects of the present disclosure.

FIG. 4 is a perspective view of a dust control enclosure of a dust control system in accordance with one or more aspects of the present disclosure. In one or more embodiments dust control enclosure 66 comprises a flexible collapsible material. In one or more embodiments, the dust control enclosure 66 is shaped in an accordion shape or a donut shape so that the dust control enclosure 66 may expand and collapse to create a seal against the container 12 and the outlet 18 or hopper 60. In one or more embodiments, dust control enclosure 66 may comprise flexible collapsible material that acts as a spring to form such a seal. In one or more embodiments, the dust control enclosure 66 may be in any other shape and may comprise any material suitable to form such a seal.

The dust control enclosure 66 may be permanently or temporarily coupled, affixed or otherwise attached to the hopper 60, the outlet 18 or the container 12. In one or more embodiments, the dust control enclosure 66 is positioned or disposed between the container 12 and the hopper 60 or outlet 18 to cover the discharge gate 40 of the container 12. The discharge gate 40 may comprise a clamshell such that rotation of the gate mechanism 220 caused the discharge gate 40 to be in an open position or a closed position. While a clamshell design for discharge gate 40 is illustrated in FIG. 4, the present disclosure contemplates any type of discharge gate 40 including, but not limited to, a horizontally or vertically slidable gate, a metering gate, for example, with slots, a flap, or any combination thereof.

In one or more embodiments, the dust control enclosure 66 extends vertically from a main chute, for example, a main chute extending from container 12 to discharge gate 40, a main chute coupled to the container 12, or any other mechanism or device that directs the discharge of bulk material 38 from the container 12. The dust control enclosure 66 may make contact with the container 12 when the container 12 is placed or disposed on the frame 16. A seal is created on both ends of the dust control enclosure 66. For example, a first seal is created where the dust control enclosure 66 contacts with the container 12 and a seal is created where the dust control enclosure 66 contacts with the hopper 60 (as illustrated in FIG. 2) or the outlet 18. The dust control enclosure 66 aligns with the discharge gate 40 of the container 12, the hopper 60 and the outlet 14 such that bulk material 38 may be discharged to the blender unit 20.

Dust, dust emissions, particulates or portions of the bulk material 38 generated by the discharge of the bulk material 38 (for example, the dust generated by the bulk material 38 falling from the container 12 towards the blender hopper 22) is contained, kept enclosed or captured within the container 12, the dust control enclosure 66, the hopper 60 or any other device or mechanism along the path of discharge of the bulk material 38. The captured dust may be reclaimed by an external device, for example, a vacuum system 42 disposed within the frame 16 or in close proximity to the frame 16. In one or more embodiments, the dust control enclosure 66 may comprise a spring (not shown). The spring causes the flexible collapsible material of the dust control enclosure 66 to create a strong positive seal against the container 12 and the outlet 18 or the hopper 60.

In one or more embodiments, the dust control enclosure 66 is coupled to the frame 16 such that once installed, dust control enclosure 66 remains at the site or predetermined location throughout the duration of an operation. For example, dust control enclosure 66 may be coupled to hopper 60 or outlet 18 where the hopper 60 or the outlet 18 is coupled to the frame 16. In this manner, the dust control enclosure 66 may not require any additional installation and may be used as a dust control system 36 to contain any generated dust throughout a given operation with any one or more containers 12 disposed on or removed from the dust control enclosure 66.

FIG. 5 is a perspective view of one or more dust control panels for a dust control system in accordance with one or more aspects of the present disclosure. Generally shown at 500 is a dust control system 36 as illustrated in FIG. 3 with dust control panels 68. In one or more embodiments, one or more dust control panels 68 may be affixed to, disposed on or coupled to the frame 16 at, about or near the outlet 18. Dust control panels 68 may comprise sheet metal, canvas, plastic, or any other material that forms a seal at the top of the frame 16 and at the opening of the outlet 18 or directly below a container 12 that is disposed on the frame 16 to prevent dust from migrating or falling through the frame 16 to other components of the frame 16 or into the surrounding air. The dust panel 68 encloses a top portion of the frame 16 at the outlet 18 such that no dust or other material (such a portion of the bulk material 38 being discharged) may fall from a top portion of the frame and through the frame 16 to the surrounding environment or within frame 16. In one or more embodiments, the dust control panel 68 may have an opening, cutout or slot that permits the outlet 18 to project or protrude through the dust control panel 68. The opening of the dust control panel 68 fits securely about the outlet 18. In one or more embodiments, the opening of the dust control panel 68 may fit or be positioned flush against the outlet 18. While dust control panel 68 is shown as a solid piece of material, the present disclosure contemplates that the dust control panel 68 may be a plurality of pieces coupled together to form a single panel. For example, instead of disposing a solid dust control panel 68 over the outlet 18, the dust control panel 68 may be two pieces that may be coupled together once disposed on the frame 16. While FIG. 5 illustrates a dust control panel 68 disposed about each outlet 18, the present disclosure contemplates any one or more dust control panels 68 disposed about any one or more outlets 18.

Figure 6:
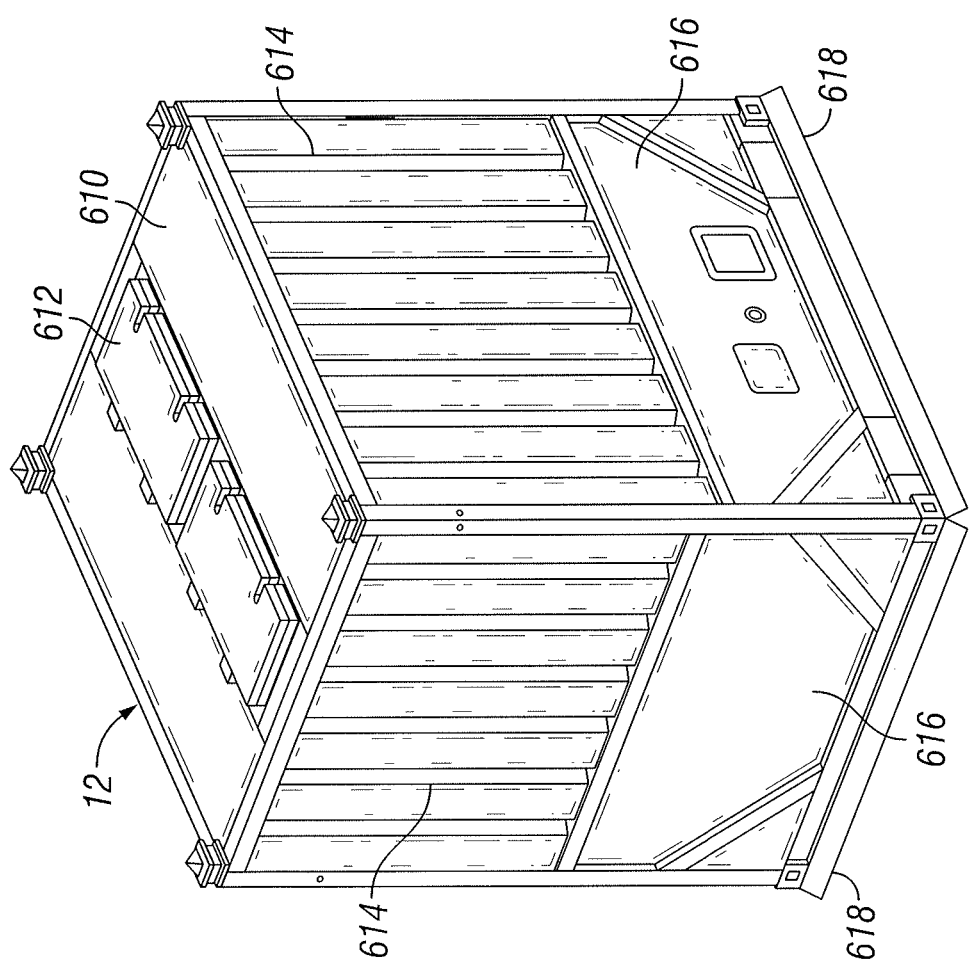
FIG. 6 is a perspective view of one or more dust enclosure panels for a container in accordance with one or more aspects of the present disclosure.

FIG. 6 is a perspective view of one or more dust enclosure panels for a container in accordance with one or more aspects of the present disclosure. Some containers, such as container 12, may comprise side walls 614 but may be open on top such that bulk material 38 may be discharged into the container 12. As illustrated in FIG. 6, a top dust enclosure panel or shroud 610 may enclose the top portion of container 12. Bulk material 38 may be discharged into the container through an opening 612. Opening 612 may be any type of gate, portal or other opening that includes an open position and a closed position such that when in the open position bulk material 38 may be discharged into the container 12 and when in the closed position bulk material 38 is contained within the container 12.

In one or more embodiments, the undercarriage of a container 12 may be exposed such that the discharge gate 40, the bottom portion of the container 12 or any other device or component associated with the bottom portion of the container 12 may be visible or exposed. In one or more embodiments, a bottom dust enclosure panel or shroud 616 may enclose all sides of the bottom portion of container 12. For example, if a container 12 is generally rectangular in shape, then bottom dust enclosure panels 616 may comprise two side dust enclosure panels, a front dust enclosure panel, and a back dust enclosure panel such that all four sides of the bottom portion of the container 12 are enclosed by dust enclosure panels as illustrated in FIG. 6. Disposing or placing bottom dust enclosure panels 616 around the bottom portion of the container 12 prevents dust from escaping into the air during discharge of the bulk material 38 as the discharge gate 40 is completely enclosed.

The bottom dust enclosure panels 616 and the top dust enclosure panel 610 may comprise sheet metal or any other material that may be coupled to the container 12 or a frame of the container 12 to prevent dust from escaping from the container 12. In one or more embodiments a dust seal 618 may be disposed at the bottom of the container 12 and may be coupled to the bottom of the bottom panels 616 or to the bottom portion of the container 12 to form a seal between the container 12 and the frame 16 when the container 12 is disposed on the frame 16. For example, the container 12 may comprise alignment guides at the corners of the container 12 that correspond to alignment guides of the frame 16. These alignment guides may not permit the container 12 to sit flush against the frame 16 or may create a gap between the container 12 and the frame 16. The dust seal 618 is of a sufficient shape and size to create a seal between the bottom portion of the bottom dust enclosure panels 616 and the frame 16. The dust seal 618 may be a single seal or may be a plurality of seals that are coupled together that fully seal the perimeter of the interface of the container 12 with the frame 16. The seal 618 may comprise a flexible material that compresses to create a tight seal between the container 12 and frame 16 when the container 12 is disposed on the frame 16. In one or more embodiments, a vacuum system 42 may be used instead of the dust seal 618. A vacuum system 42 may be disposed at the bottom portion of the container to reclaim dust from the discharge of the bulk material 38.

In one or more embodiments, one or more dust control panels 68 illustrated in FIG. 5 may be disposed on or as part of a frame 16 where a container 12 comprises a dust control system as illustrated in FIG. 6.

In one or more embodiments, a container system comprises a support structure, wherein the support structure comprises a frame, an outlet coupled to the frame, a dust control enclosure coupled to the outlet, wherein the dust control enclosure comprises a flexible and collapsible material, a container disposed on the frame, wherein the container stores bulk material, and wherein the dust control enclosure forms a seal between the container and the outlet, and a discharge gate of the container for discharging a material from the container, wherein the dust control enclosure forms a seal between the container and the outlet, and wherein the dust control enclosure is configured to control dust emissions associated with the discharge of the bulk material. In one or more embodiments, the dust control enclosure comprises an accordion shape a spring or both. In one or more embodiments, the container system further comprises a hopper disposed between the outlet and the dust control enclosure. In one or more embodiments the container system further comprises a vacuum system, wherein the vacuum system reclaims dust generated when the bulk material is discharged from the container. In one or more embodiments, the container system further comprises a dust control panel disposed about the outlet and coupled to a top portion of the frame, wherein the dust control panel prevents a portion of the discharged bulk material from falling from the top portion of the frame through the frame, wherein an opening of the dust control panel fits securely about the outlet. In one or more embodiments, a top portion and a bottom portion of the container are enclosed by a plurality of dust enclosure panels. In one or more embodiments, the container system further comprises a dust seal coupled to the bottom portion of the container, wherein the dust seal forms a seal between the container and the frame. In one or more embodiments, the container system further comprises a vacuum system disposed at least in one or more of the frame and a bottom portion of the container, wherein the vacuum system reclaims dust from a discharge of the bulk material. In one or more embodiments the dust control enclosure is permanently coupled to the outlet.

In one or more embodiments, discharging a bulk material of a container via a discharge gate of the container, wherein the container is disposed on a frame of a support structure, and wherein the bulk material is discharged via an outlet coupled to the frame and controlling dust emissions associated with the discharge of the bulk material via a dust control enclosure disposed on the frame, wherein the dust control enclosure forms a seal between the container and the outlet, and wherein the dust control enclosure comprises a flexible and collapsible material. In one or more embodiments, the dust control enclosure comprises an accordion shape, a spring, or both. In one or more embodiments, the dust control method further comprises conveying the discharged bulk material to a hopper, wherein the hopper is disposed between the outlet and the dust control enclosure. In one or more embodiments, the dust control method further comprises reclaiming dust generated when the bulk material is discharged from the container via a vacuum system. In one or more embodiments, the dust control method further comprises preventing a first portion of the discharged bulk material from falling from a top portion of the frame through the frame via a dust control panel disposed about the outlet and coupled to the top portion of the frame. In one or more embodiments, the dust control method further comprises preventing a second portion of the discharged bulk material from falling from a top portion of the frame through the frame via a plurality of dust enclosure panels, wherein the plurality of dust enclosure panels enclose a top portion and a bottom portion of the container. In one or more embodiments, the dust control method further comprises preventing a third portion of the discharged bulk material from falling from a top portion of the frame through the frame via a dust seal coupled to the bottom portion of the container, wherein the dust seal forms a seal between the container and the frame. In one or more embodiments, the dust control method further comprises reclaiming dust from a discharge of the bulk material via a vacuum system, wherein the vacuum system is disposed within the frame. In one or more embodiments, the dust control enclosure is permanently coupled to the outlet.

Although the present disclosure and its advantages have been described in detail, it should be understood that various changes, substitutions and alterations can be made herein without departing from the spirit and scope of the disclosure as defined by the following claims.

What is claimed is:

1. A container system, comprising:
   a support structure, wherein the support structure comprises a frame;
   an outlet coupled to the frame;
   a dust control enclosure coupled to the outlet, wherein the dust control enclosure comprises a flexible and collapsible material;
   a container disposed on the frame, wherein the container stores bulk material, and wherein the dust control enclosure forms a seal between the container and the outlet;
   a discharge gate of the container for discharging the bulk material from the container, wherein the dust control enclosure forms a seal between the container and the outlet, and wherein the dust control enclosure is configured to control dust emissions associated with the discharge of the bulk material; and
   one or more actuators disposed on the support structure, wherein the one or more actuators are configured to actuate the discharge gate.

2. The container system of claim 1, wherein the dust control enclosure comprises an accordion shape.

3. The container system of claim 1, wherein the dust control enclosure comprises a spring.

4. The container system of claim 1, further comprising:
   a hopper disposed between the outlet and the dust control enclosure.

5. The container system of claim 1, further comprising:
a vacuum system, wherein the vacuum system reclaims dust generated when the bulk material is discharged from the container.

6. The container system of claim 1, further comprising:
a dust control panel disposed about the outlet and coupled to a top portion of the frame, wherein the dust control panel prevents a portion of the discharged bulk material from falling from the top portion of the frame through the frame, wherein an opening of the dust control panel fits securely about the outlet.

7. The container system of claim 1, wherein a top portion and a bottom portion of the container are enclosed by a plurality of dust enclosure panels.

8. The container system of claim 7, further comprising:
a dust seal coupled to the bottom portion of the container, wherein the dust seal is configured to seal the container to the frame.

9. The container system of claim 7, further comprising:
a vacuum system disposed at least in one or more of the frame and a bottom portion of the container, wherein the vacuum system reclaims dust from a discharge of the bulk material.

10. The container system of claim 1, wherein the dust control enclosure is permanently coupled to the outlet.

11. A dust control method, comprising:
discharging a bulk material of a container via a discharge gate of the container, wherein the container is disposed on a frame of a support structure, and wherein the bulk material is discharged via an outlet coupled to the frame, wherein one or more actuators are disposed on the support structure, wherein the one or more actuators are configured to actuate the discharge gate; and
controlling dust emissions associated with the discharge of the bulk material via a dust control enclosure disposed on the frame, wherein the dust control enclosure forms a seal between the container and the outlet, and wherein the dust control enclosure comprises a flexible and collapsible material.

12. The dust control method of claim 11, wherein the dust control enclosure comprises an accordion shape.

13. The dust control method of claim 11, wherein the dust control enclosure comprises a spring.

14. The dust control method of claim 11, further comprising:
conveying the discharged bulk material to a hopper, wherein the hopper is disposed between the outlet and the dust control enclosure.

15. The dust control method of claim 11, further comprising:
reclaiming dust generated when the bulk material is discharged from the container via a vacuum system.

16. The dust control method of claim 11, further comprising:
preventing a first portion of the discharged bulk material from falling from a top portion of the frame through the frame via a dust control panel disposed about the outlet and coupled to the top portion of the frame.

17. The dust control method of claim 11, further comprising:
preventing a second portion of the discharged bulk material from falling from a top portion of the frame through the frame via a plurality of dust enclosure panels, wherein the plurality of dust enclosure panels enclose a top portion and a bottom portion of the container.

18. The dust control method of claim 17, further comprising:
preventing a third portion of the discharged bulk material from falling from a top portion of the frame through the frame via a dust seal coupled to the bottom portion of the container, wherein the dust seal is configured to seal the container to the frame.

19. The dust control method of claim 17, further comprising:
reclaiming dust from a discharge of the bulk material via a vacuum system, wherein the vacuum system is disposed within the frame.

20. The dust control method of claim 11, wherein the dust control enclosure is permanently coupled to the outlet.

* * * * *